US011385760B2

(12) United States Patent
Capozella et al.

(10) Patent No.: US 11,385,760 B2
(45) Date of Patent: *Jul. 12, 2022

(54) AUGMENTABLE AND SPATIALLY MANIPULABLE 3D MODELING

(71) Applicant: Rockwell Automation Technologies, Inc., Mayfield Heights, OH (US)

(72) Inventors: Michael Capozella, Cleveland Heights, OH (US); Paul Griesmer, Broadview Heights, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,165

(22) Filed: Apr. 13, 2020

(65) Prior Publication Data

US 2020/0310624 A1    Oct. 1, 2020

Related U.S. Application Data

(63) Continuation of application No. 15/080,482, filed on Mar. 24, 2016, now Pat. No. 10,620,788.

(Continued)

(51) Int. Cl.
*G06F 3/048*     (2013.01)
*G06F 3/04815*    (2022.01)
(Continued)

(52) U.S. Cl.
CPC ...... *G06F 3/04815* (2013.01); *G06F 3/04845* (2013.01); *G06F 3/04883* (2013.01);
(Continued)

(58) Field of Classification Search
CPC ........ G06F 3/041; G06F 3/048; G06F 3/0481; G06F 3/0484; G06F 3/0488;
(Continued)

(56) References Cited

U.S. PATENT DOCUMENTS

| 7,171,344 B2* | 1/2007 | Lind ................. G06F 30/20 703/6 |
| 7,564,469 B2 | 7/2009 | Cohen |

(Continued)

FOREIGN PATENT DOCUMENTS

EP    2 889 844 A2    1/2015

OTHER PUBLICATIONS

Extended European Search Report Issued in European Application No. 16186462.4-1502, dated Jan. 23, 2017, 6 pages (EP107648RK).

(Continued)

*Primary Examiner* — Mahelet Shiberou (57) ABSTRACT

Augmentable and manipulable modeling of equipment provides a three dimensional, manipulable base model image of an equipment specimen on a display system using optical base model data obtained using a computing system. Base model data collection can be user-controlled to permit changing spatial aspects of the base model image (size, perspective, orientation). User inputs concerning functions, conditions and the like can be transmitted from a model control unit to the computing system via a two-way communication link, generating augmenting data that is combined with the base model data to render augmented three dimensional models. User inputs also can be received directly by the computing system, for example using a display system touchscreen. Augmenting data received by the computing system and/or display system also can be transmitted via the communication link to the model control unit. Such implementations permit realistic simulation of the effects of a control system on a real world system, equipment, etc.

20 Claims, 11 Drawing Sheets

Related U.S. Application Data (60) Provisional application No. 62/212,402, filed on Aug. 31, 2015.

(51) Int. Cl.
  *G06T 17/00* (2006.01)
  *G06T 19/20* (2011.01)
  *G06T 19/00* (2011.01)
  *G06T 7/564* (2017.01)
  *G06F 3/04845* (2022.01)
  *G06F 3/04883* (2022.01)
  *G06T 15/20* (2011.01)

(52) U.S. Cl.
  CPC .............. *G06T 7/564* (2017.01); *G06T 15/20* (2013.01); *G06T 17/00* (2013.01); *G06T 19/006* (2013.01); *G06T 19/20* (2013.01); *G06T 2207/30108* (2013.01); *G06T 2210/04* (2013.01)

(58) Field of Classification Search
  CPC .............. G06F 3/04815; G06F 3/04845; G06F 3/04883; G06F 3/004845; G06F 3/0346; G06F 3/0304; G06F 3/011; G06T 7/564; G06T 15/00; G06T 15/20; G06T 17/00; G06T 19/00; G06T 19/006; G06T 19/20; G06T 2210/04; G06T 2210/22; G06T 2207/30108
  See application file for complete search history.

(56) References Cited

U.S. PATENT DOCUMENTS

| | | | |
|---|---|---|---|
| 8,487,926 B2 | 7/2013 | Lee et al. | |
| 8,718,612 B2 | 5/2014 | Calman et al. | |
| 8,803,916 B1 | 8/2014 | Paczkowski et al. | |
| 2004/0189631 A1* | 9/2004 | Kazi | B25J 9/1671 345/418 |
| 2005/0080515 A1* | 4/2005 | Watanabe | B25J 9/1671 700/264 |
| 2011/0164114 A1* | 7/2011 | Kobayashi | G01B 11/25 348/46 |
| 2012/0239192 A1* | 9/2012 | Yamato | B25J 9/1682 700/250 |
| 2013/0066616 A1* | 3/2013 | Shimakawa | G05B 19/4068 703/7 |
| 2013/0135295 A1 | 5/2013 | Li et al. | |
| 2014/0002493 A1 | 1/2014 | Mitchell et al. | |
| 2014/0043329 A1* | 2/2014 | Wang | G06K 9/00201 345/420 |
| 2014/0236565 A1* | 8/2014 | Kuwahara | B25J 9/1671 703/22 |
| 2014/0282220 A1 | 9/2014 | Wantland et al. | |
| 2015/0006361 A1 | 1/2015 | Kumar et al. | |
| 2015/0109480 A1 | 4/2015 | Wang et al. | |
| 2015/0154322 A1* | 6/2015 | Fonte | G06F 16/22 351/178 |
| 2015/0161821 A1* | 6/2015 | Mazula | G06T 19/006 345/419 |
| 2015/0187136 A1* | 7/2015 | Grimaud | G06T 19/006 345/420 |
| 2016/0012160 A1* | 1/2016 | Mohacsi | G06F 30/13 703/1 |
| 2016/0217590 A1* | 7/2016 | Mullins | G06T 7/40 |
| 2016/0292920 A1 | 10/2016 | Sprock et al. | |
| 2016/0327293 A1 | 11/2016 | Grabowski et al. | |

OTHER PUBLICATIONS

Doil, F., et al., Augmented Reality for Manufacturing Planning, Virtual Environments 2003, May 22, 2003, pp. 71-76, DOI: 10.1145/769953.769962, ISBN: 978-1-58113-686-9, XP058356806, New York, NY.

Communication pursuant to Article 94(3) EPC from the European Patent Office, application No. 16 186 462.4-1230 dated May 14, 2020, 9 pages.

* cited by examiner

AUGMENTABLE AND SPATIALLY MANIPULABLE 3D MODELING

RELATED APPLICATIONS

This application claims the benefit of, and priority to, U.S. patent application Ser. No. 15/080,482, entitled "AUGMENTABLE AND SPATIALLY MANIPULABLE 3D MODELING", filed Mar. 24, 2016, and which is also hereby incorporated by reference in its entirety for all purposes. This application also claims the benefit of, and priority to, U.S. Provisional Patent Application No. 62/212,402, entitled "AUGMENTABLE AND SPATIALLY MANIPULABLE 3D MODELING", filed Aug. 31, 2015, and which is also hereby incorporated by reference in its entirety for all purposes.

TECHNICAL FIELD

Aspects of the disclosure are related to computing hardware and software technology.

TECHNICAL BACKGROUND

Large and/or complex equipment (e.g., machinery, environments, systems, etc. in an industrial automation environment) frequently has been demonstrated for and/or reviewed by individuals using demonstration systems (e.g., devices and software)—such demonstrations are frequently used in sales, training, troubleshooting and other common scenarios. These demonstration systems display operational and performance characteristics of the equipment using block, polygonal and other symbolic and/or representational two dimensional graphics so that various features of the equipment can be demonstrated without the equipment itself having to be present.

Equipment demonstration software applications that run on computing systems commonly provide some type of user interface to present information to the user and to receive user inputs. One example of such a system is the Allen-Bradley PanelView Plus 1000 demonstration system. Most applications typically present the user with a static list of functions on the user interface from which the user may select. For example, an operating system typically enables a user to select from menus of system functions, installed applications, and other available operations on the home screen of the operating system. Specific demonstration software can also provide various options to be selected by a user concerning the operation and performance of the equipment being considered.

However, such applications do not display these operational and performance characteristics and information in a manner that allows the user to consider how the equipment operates in a three dimensional setting, such as a factory floor or other real world operational location. Moreover, such applications fail to show the user what the equipment looks like in reality while operating under various user-controlled and user-selected conditions.

OVERVIEW

Techniques, apparatus, methods and computer program products that permit augmentable and manipulable modeling of equipment (e.g., in an industrial automation environment) are disclosed herein. In at least one implementation, a three dimensional, manipulable base model image of an equipment specimen is rendered on a display system using optical base model data obtained using a computing system. The base model data collection component of the computing system can be user-controlled to permit changing the spatial aspects of the base model image (e.g., its size, perspective, orientation in the modeling environment). Model control data such as user inputs concerning functions, conditions and the like can be transmitted from a model control unit (e.g., an industrial control system) to the computing system via a two-way communication link, generating augmenting data that is combined with the base model data to render augmented three dimensional models. User inputs also can be received directly by the computing system, for example using a touchscreen that is part of the display system. Such augmenting data received by the computing system and/or display system also can be transmitted via the communication link to the model control unit. Such implementations permit realistic simulation of the effects of a control system on a real world system, equipment, etc. The model control unit (e.g., a demonstration unit) is used to drive a realistic three dimensional model on the connected computing system (e.g., on a tablet or the like) even though the actual equipment is not present—the model control unit and computing system communicate to drive the modeling application. As the computing system (or at least its data acquisition device, such as a camera) is moved relative to the base model data source, corresponding visual changes can be made to the model, reproducing the effect of being in the same real space as the equipment being modeled.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for displaying augmentable three dimensional modeling of an equipment specimen or the like. Applications typically present users with a graphic representation of functions, conditions and operations of equipment being demonstrated, reviewed, etc. When the equipment specimen is sufficiently large and thus not portable, or is otherwise unavailable for demonstrating its operation, two dimensional graphic depictions of operational characteristics, performance, features and the like have typically been used. Frequently this provides the user with less information than desired or necessary for evaluation of the equipment specimen. Apparatus, techniques, methods, systems disclosed herein help to enhance the demonstrative value of user interaction and evaluation by providing an augmentable three dimensional model that permits not only viewing of a three dimensional demonstration of the equipment specimen, but manipulation of the augmented model to allow the user full inspection of the model in operational conditions.

In at least one implementation, a computing system acquires target image data from a target image source and receives control data from a model control unit, a display device, a user interface and/or other appropriate control data source that can provide augmenting data. The target image data can include base model data that relates to an equipment specimen comprising one or more machines or the like, or any other industrial asset(s) in an industrial automation environment. Depending on the equipment specimen selected and acquired by the computer system, various control options are presented to a user via the model control unit. Selection of one or more control options generates augmenting data that is received and processed by the computer system to generate an augmented model of the equipment specimen (i.e., a model showing modifications to a base model) on a computer system display system.

Subsequent changes to the augmenting data and/or further inputs of augmenting data alter the augmented model. Likewise, user interaction with the augmented model (e.g., via a touchscreen or the like on the computer system, or changes of the relative position of a base model data acquisition device relative to a base model data source) generates changes in the presentation of the equipment specimen.

Movement of the target image source and/or the target image capturing device alters the spatial presentation of the base model to which the augmenting data is applied (e.g., by providing updated spatial data that modifies the spatial data originally provided as a component of base model data used to render an image of the base model). Therefore, a user can move the base model data acquisition device about the base model data source just as a person standing in the same space as a real equipment specimen could walk around the equipment (and/or move the equipment to view different perspectives of the equipment at different distances/orientations). Likewise, movement of the base model data source can change the three dimensional base model's position, size and/or orientation. Thus the augmented model changes and/or updates dynamically as user interaction and selections are implemented.

Figure 1A:
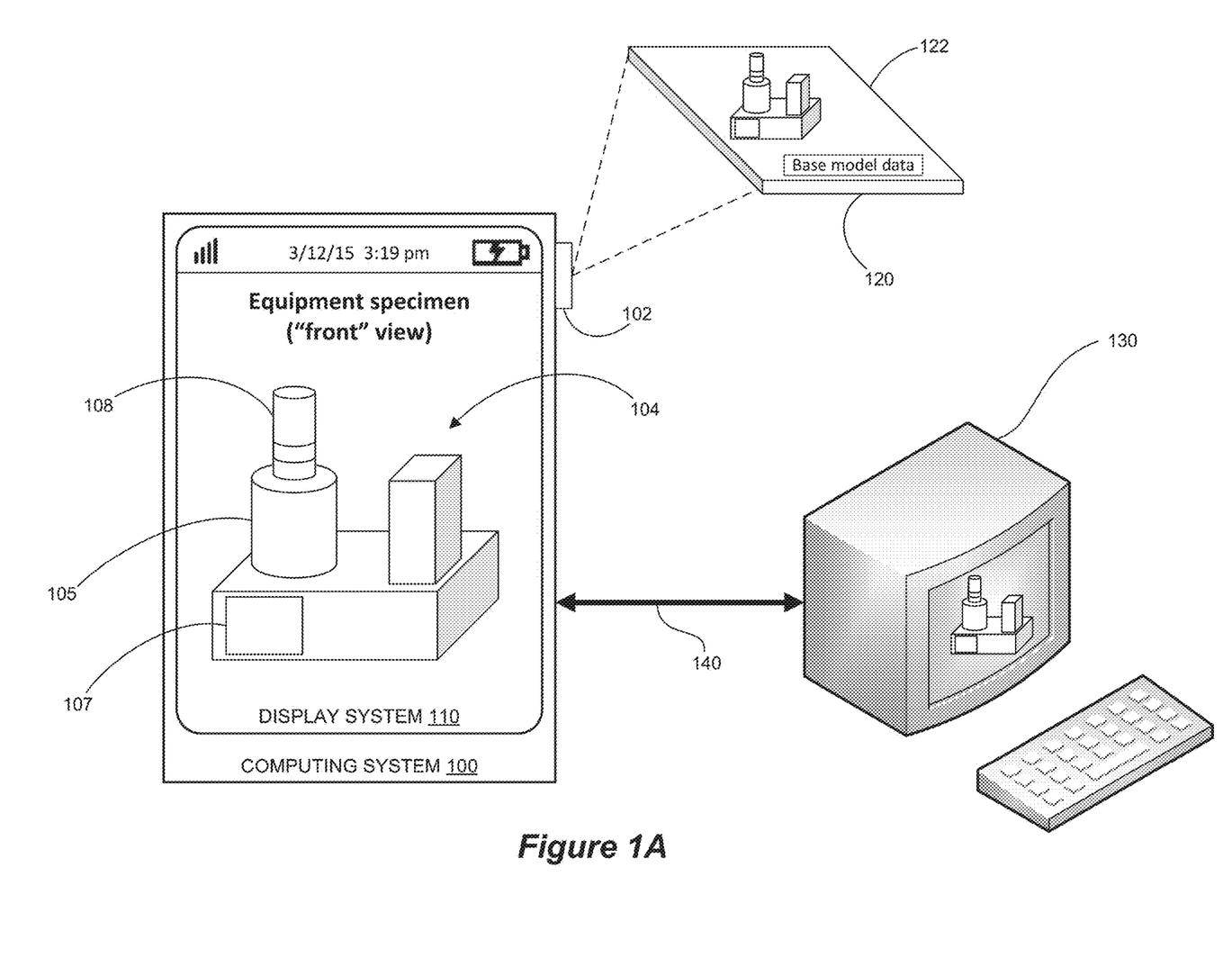
FIG. 1A is a diagram that illustrates an operational scenario of a computing system in an exemplary implementation.
Figure 1B:
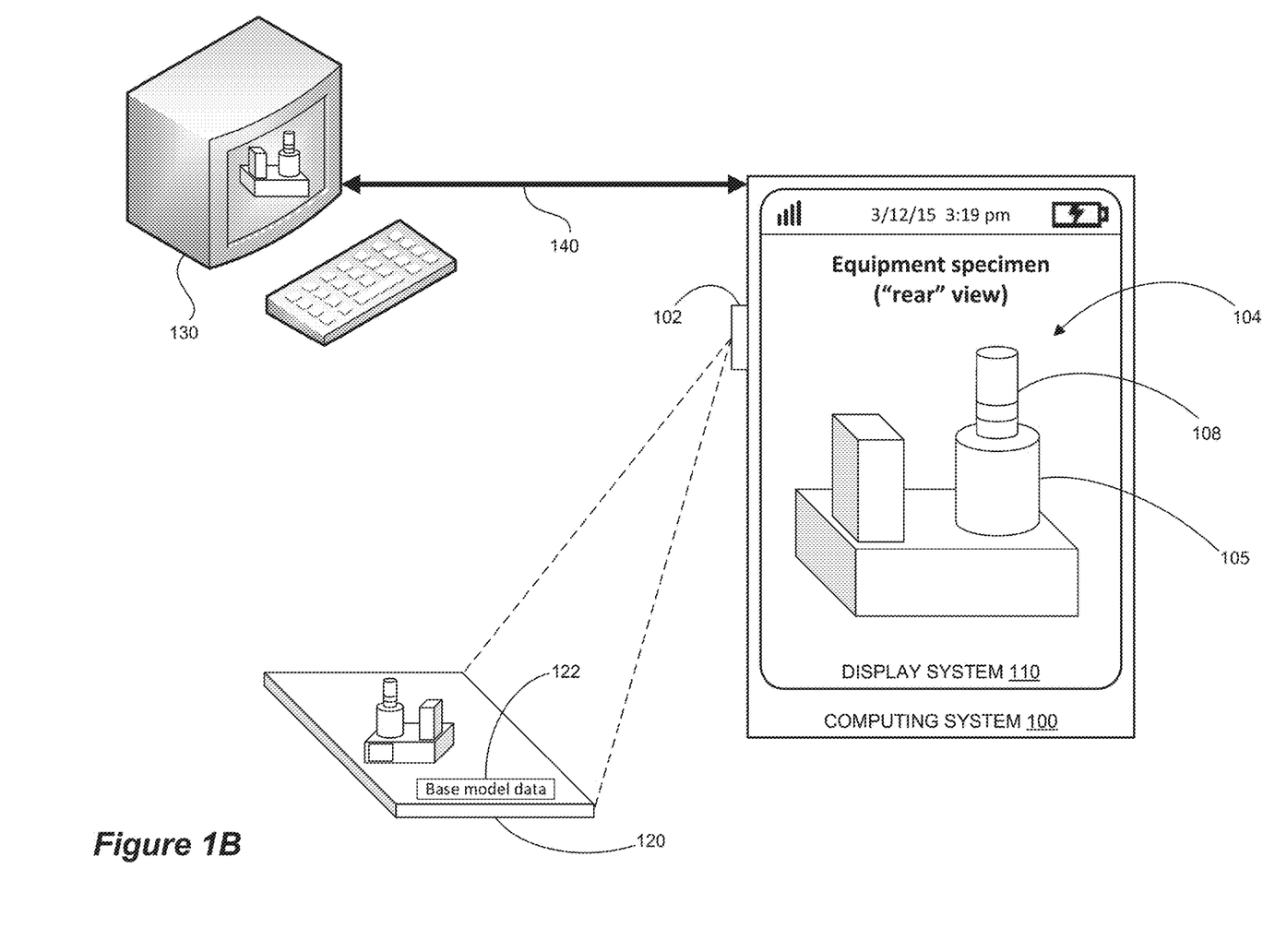
FIG. 1B is a diagram that illustrates an operational scenario of a computing system in an exemplary implementation.
Figure 2:
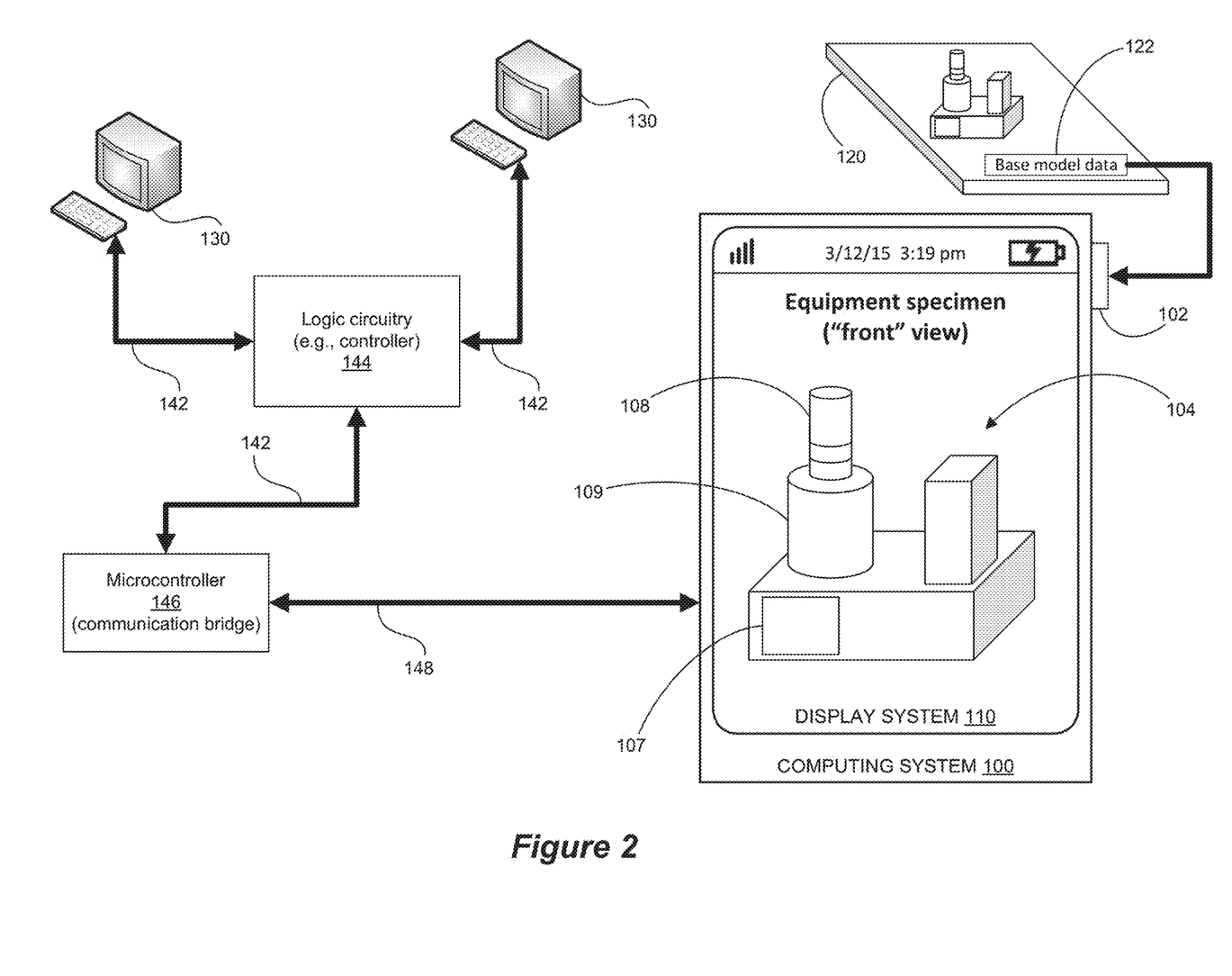
FIG. 2 is a diagram that illustrates an operational scenario of a computing system in an exemplary implementation.
Figure 4A:
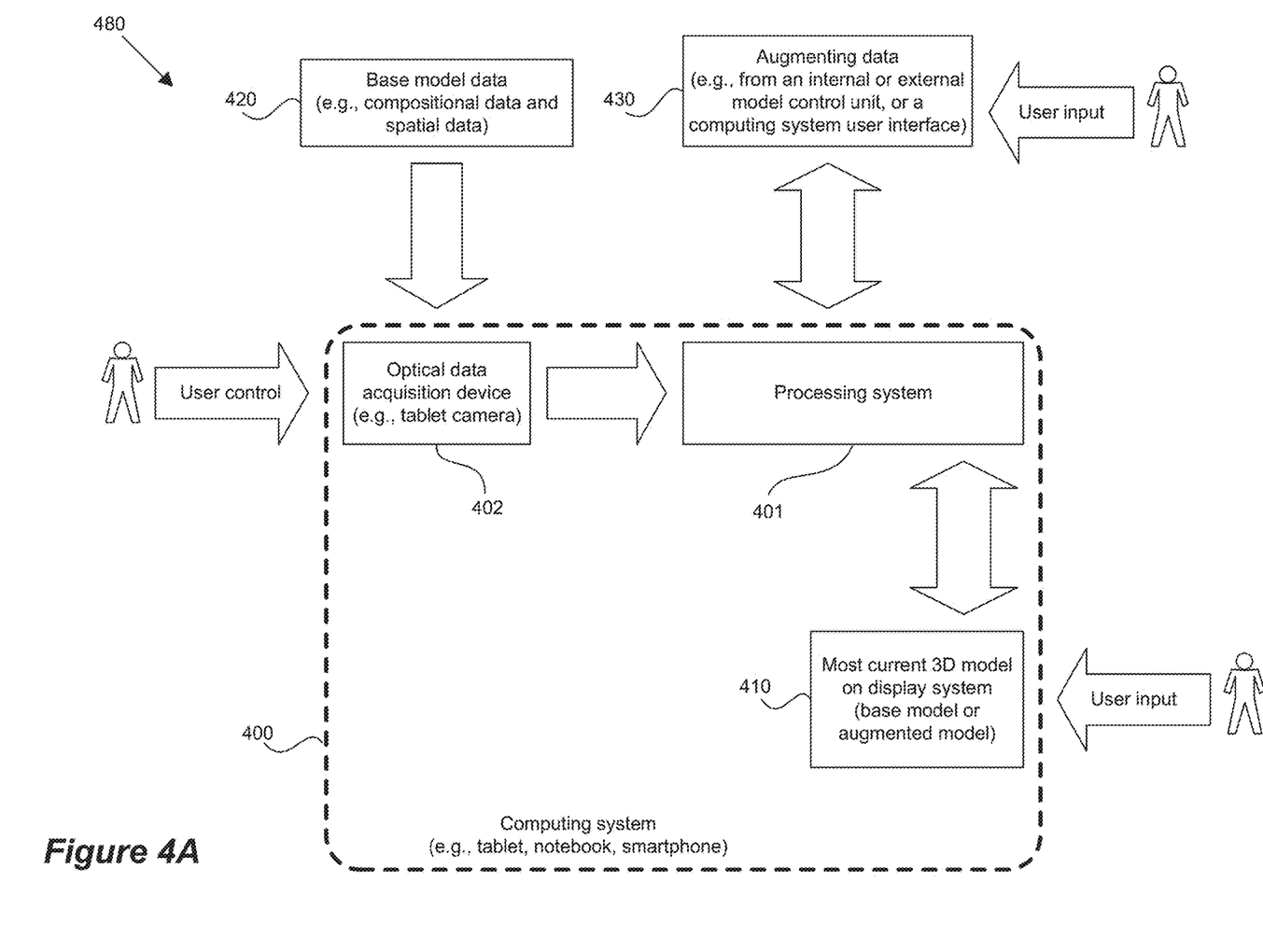
FIGS. 4A and 4B are flow diagrams that illustrate operation of one or more computing systems in an exemplary implementation.
Figure 4B:
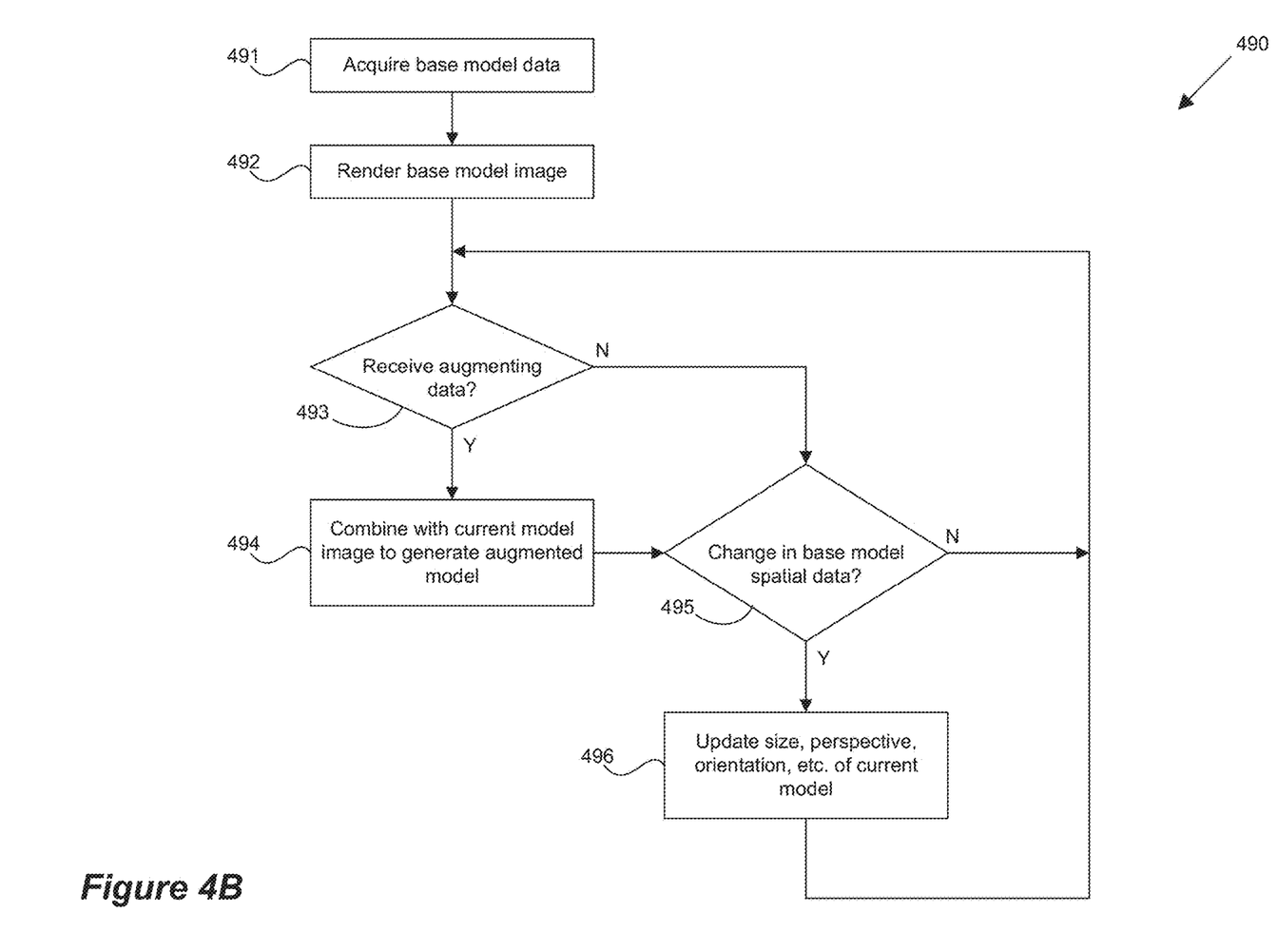
Figure 5:
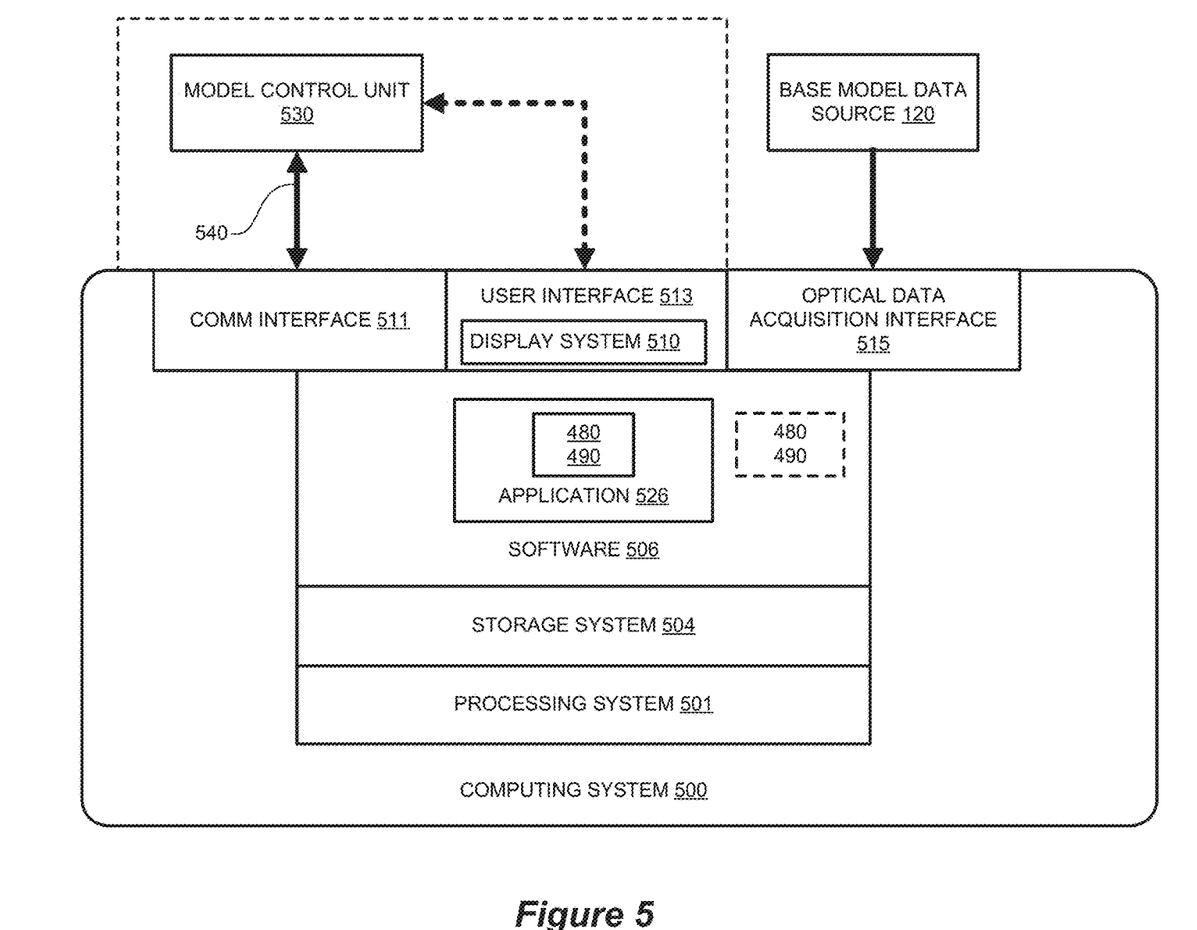
FIG. 5 is a block diagram that illustrates a computing system in an exemplary implementation.

Referring to the drawings, FIGS. 1A and 1B show the spatial manipulation of the three dimensional base model image based on relative movement of the base model data source and the optical data acquisition device (e.g., a camera that is integral to or separate from a computing system). FIG. 2 shows communication linkage between one or more model control units and a computing system providing augmentable and manipulable modeling. FIGS. 3A-3E show a sequence of user inputs affecting (i.e., augmenting and updating) a base model image. FIGS. 4A and 4B show display processes of augmentable and manipulable modeling. FIG. 5 illustrates an exemplary computing system that can be used to perform display processes and the like relating to augmentable and manipulable modeling.

Turning to FIG. 1A, an operational scenario of a computing system 100 is illustrated in an exemplary implementation. Computing system 100 comprises display system 110. Display system 110 typically receives data to display from computing system 100, and may be integrated within computing system 100, such as in a laptop computer, tablet, or smartphone, or may be separate from computing system 100, including geographical separation over a communication network. Data for generating images on display system 110 can be acquired from a base model data source 120, such as a target image or other data target that provides base model data 122 that is optically or otherwise readable and allows for determining and updating the spatial relationship between the base model data source 120 and any data acquisition device (optical or otherwise) that can move relative to the base model data source 120. Base model data 122 can include edge lines and other optically readable indicia that provide both compositional data (defining the three dimensional appearance of the equipment specimen, its components and their relative arrangement) and spatial data (defining the distance, perspective and orientation of the equipment specimen relative to an observer) for display system 110 of computing system 100. Other sources of base model image data and types of base model image data can be used in augmentable modeling, including other types of data that permit rendering and updating of spatial data relative to an observer or data-collecting computing system as described herein.

Computing system 100 also includes an optical data acquisition device 102 (e.g., a camera or other reader that can be built in or otherwise mounted to computing system 100). When optical data acquisition device 102 first acquires the base model data 122, that optical data is processed by computing system 100 to generate a three dimensional base model image 104, as seen in FIG. 1A. The base model image 104 of FIG. 1A is a three dimensional image of a specimen that can be a machine, application, environment or device (an industrial asset in an industrial automation environment). For example, a single piece of equipment or machinery might be the equipment specimen, or a series of machines (e.g., a production line), or an industrial automation or other space/environment (e.g., a workstation or work module in which an individual might sit or otherwise work). Other base model images can be generated using this technique. In the present disclosure, the term "equipment specimen" is intended to cover such various specimens to generate a model. In some implementations the base model image moves or otherwise changes appearance (e.g., size and orientation) on display system 110 as the optical data acquisition device 102 moves and/or as the target 120 moves. For example, when the computing system 100 moves closer to or farther away from the base model data source 120, the base model image 104 generated on display system 110 can grow in size or can shrink in size, respectively, just as the view of an equipment specimen would grow or shrink if an observer moved closer to or farther away from real equipment in real space. The computing system can also freeze the model/image of the equipment so that it doesn't move as changes are made to it.

Moreover, as the optical data acquisition device 102 and base model data source 120 move angularly relative to one another, the orientation or perspective view of base model image 104 can likewise change, as seen in FIG. 1B. If the base model image 104 illustrated in FIG. 1A shows the "front" of the equipment specimen and is captured by the computing system's optical data acquisition device 102 initially looking toward the "front" of base model data source 120, then an initial orientation of optical data acquisition device 102 looking toward the "rear" of base model data source 120, as illustrated in FIG. 1B, generates a base model image 104 of the "back" of the equipment specimen. Similarly, as noted, if optical data acquisition device 102 is initially closer to base model data source 120, then base model image 104 would appear as more of a close-up of the equipment specimen.

In the exemplary base model image 104 of FIGS. 1A and 1B, the equipment specimen includes a rotating drum component 105, a message screen 107, and a warning light tower 108. Because the message screen 107 is mounted to the front of the equipment specimen, it cannot be seen in the rear view of FIG. 1B.

A model control unit 130 is coupled to computing system 100 via communication link 140. In some implementations model control unit 130 and computing system 100 as illustrated in the Figures can be considered a single computing system implementing processes and methods described herein. Link 140 can be a single element or component, or it can be composed of multiple segments, devices, etc. that provide for appropriate signal processing, communication bridging and the like between model control unit 130 and computing system 100. The communication link 140 can connect local and/or remote model control units and can permit two-way communication between the model control unit 130 and the computing system 100. In implementations using model control units 130 that are providing demonstrations and/or other interactive activity, as shown in FIG. 2, communications between computing system 100 and any model control units 130 can utilize a more specific communication link. When coupled to computing system 100, the signals of one or more model control units 130 can be fed via Ethernet connections 142 to appropriate logic circuitry 144 (e.g., a CompactLogix L1 controller) and thence to a microcontroller 146 (e.g., an Arduino microcontroller or the like). Microcontroller 146 can communicate with computing system 100 via any appropriate communication means and/or protocol 148 (e.g., Bluetooth) to permit bidirectional communication between model control unit(s) 130 and the computing system 100. In some implementations the computing system 100 and model control unit 130 can be combined into a single mobile or portable device, for example being connected by device circuitry as link 140. Other configurations and means for enabling communication between these units can be determined by those skilled in the art.

Model control unit 130 provides options for users to control, configure and operate an augmentable and spatially manipulable 3D base model image of an equipment specimen. Some types of demonstration equipment have been used for demonstrating equipment operation without the need for the equipment being present. However, such demonstrations utilized two dimensional graphics and images that provided limited realism for users operating the demonstration equipment. Using implementations disclosed herein, operational and other selections implemented by users of such demonstration equipment generate data communicated (either directly or after suitable processing) to the computing system 100 to generate augmenting data (e.g., where augmenting data can in some implementations include spatial changes (moving a camera or mobile device that is used to receive base model data), and operational changes (user inputs to change equipment operation)) that can be combined with the 3D base model image 104 to illustrate how an equipment specimen actually operates in a real world environment.

For example, in some implementations, one or more of which are shown in FIGS. 3A-3E, a model control unit 130 can be a demonstration module rendering or otherwise generating graphic images and the like to users who wish to test or view an industrial asset (e.g., a given piece of equipment). The signals generated by such a demonstration module in some implementations control and manipulate a base model image and updated iterations of the base model image on a computing system. Similarly, signals generated by the computing system through user interaction likewise control and manipulate the model.

Figure 3A:
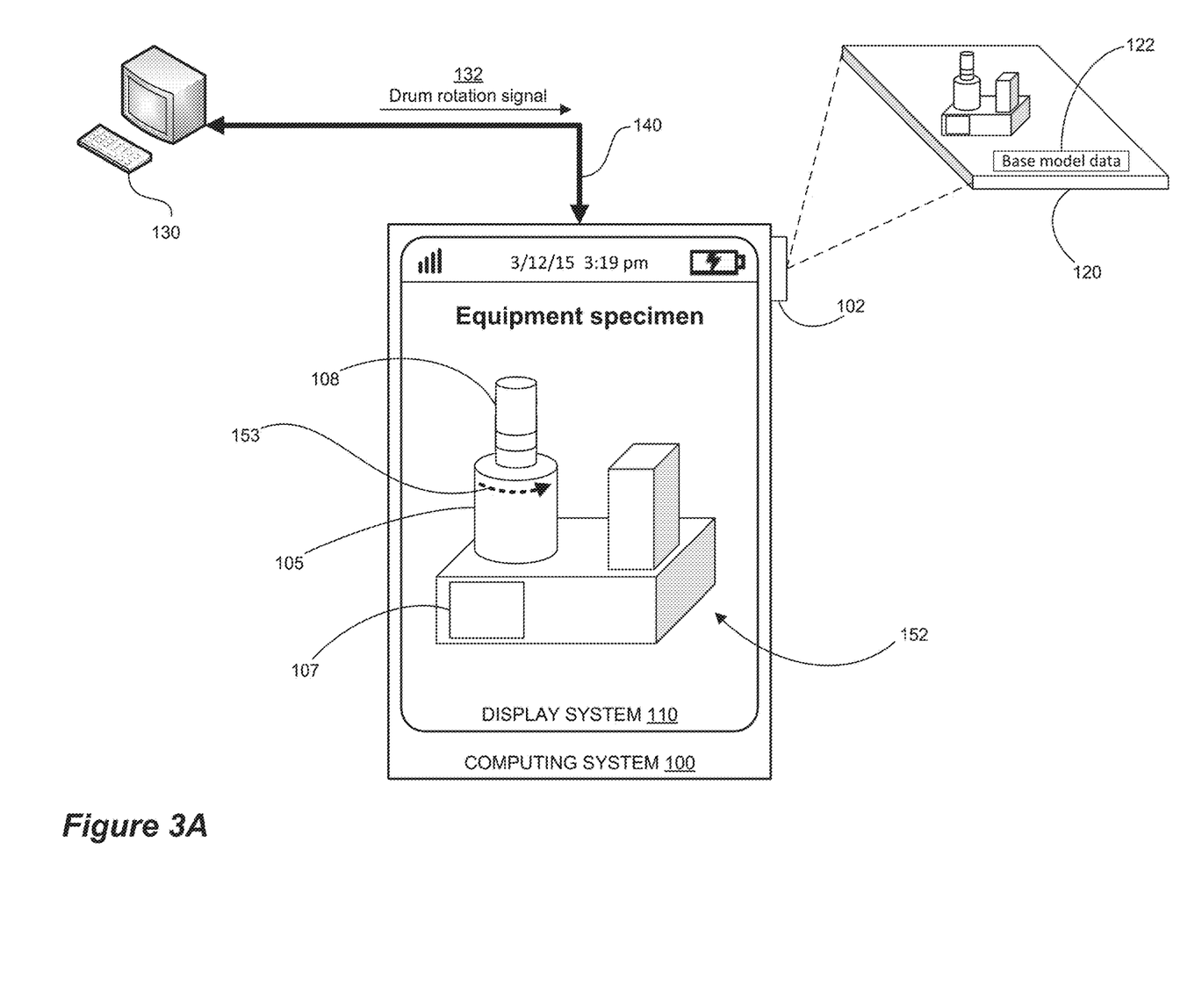
FIGS. 3A, 3B, 3C, 3D and 3E are diagrams that illustrate operational scenarios of a computing system in an exemplary implementation.
Figure 3B:
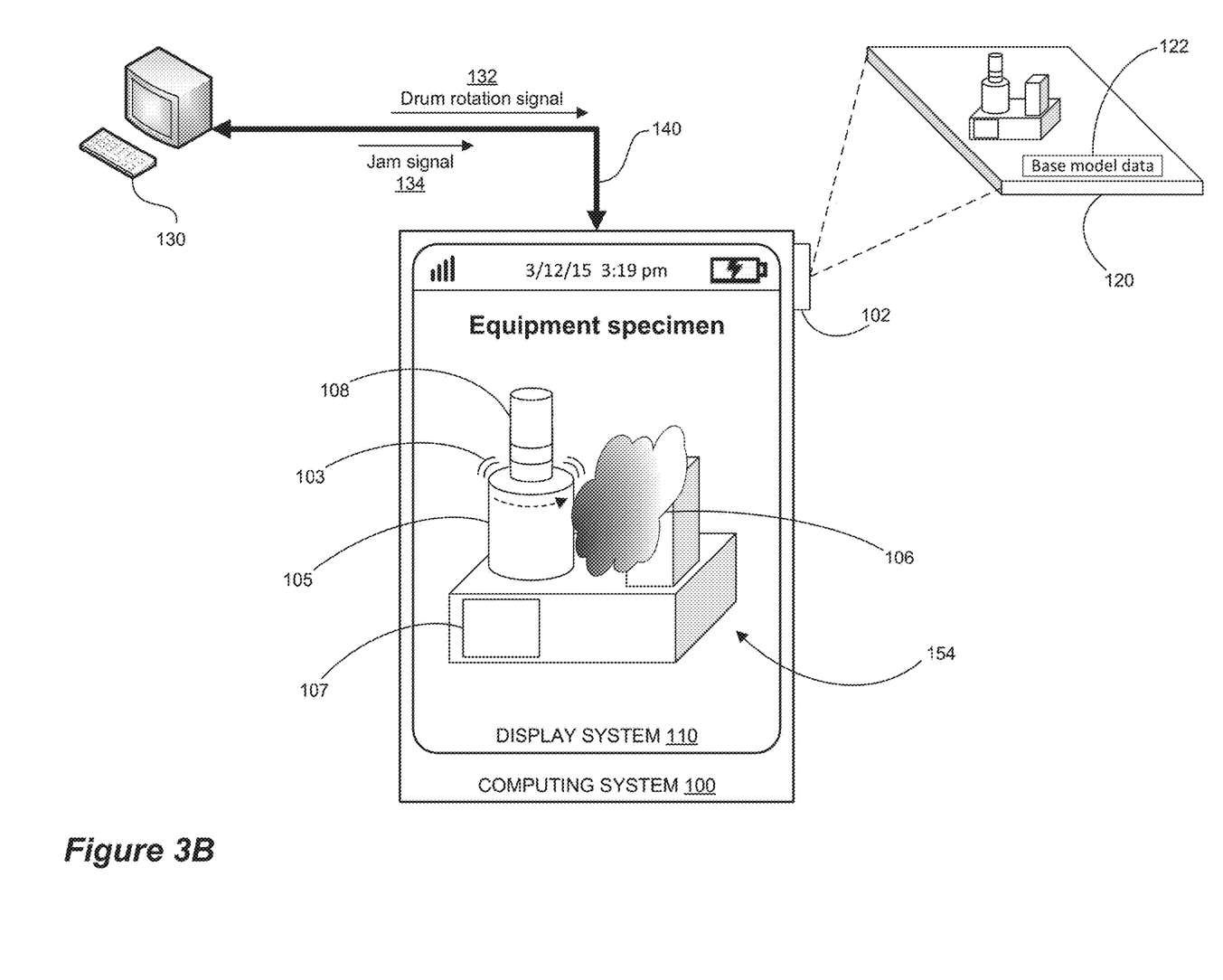

FIG. 3A shows a computing system 100 that has generated a 3D base model image 104 using base model data 122 on a base model data source 120, as captured by optical data acquisition device 102. Image 104 includes an equipment specimen having a rotating drum 105, a message screen 107, and a warning light tower 108. A user selects a "drum rotation" option on model control unit 130, which generates a drum rotation signal 132 that can be used internally within model control unit 130 (e.g., as it would be in a standard demonstration device), but which also is sent via communication link 140 to computing system 100. Drum rotation signal 132 is processed to produce augmenting data that then augments base model image 104 to create augmented model image 152 in which drum 105 is shown to rotate (as indicated in FIG. 3A by arrow 153—in the generated model image on computing system 100, image 152 actually shows the drum 105 moving as instructed). Control signal 132 also could be input directly to the computing system 100 to generate a similar augmented model image 152.

To demonstrate jamming of the rotating drum, for example, a "drum jam" option on model control unit 130 (or on computing system 100) can then be selected, generating a jam signal 134 that can be used internally within model control unit 130 (e.g., again as it would be in a standard demonstration device), but which also is sent via communication link 140 to computing system 100. Jam signal 134 is processed to produce supplemental augmenting data that updates augmented model image 152 to create an updated augmented model image 154 in which rotating drum 105 has jammed (as indicated by drum rattling 103 and by smoke 106 in FIG. 3B—in the generated model image 154 on computing system 100, image 154 actually shows the drum 105 shaking or rattling and shows smoke emerging from drum 105 in which a jam has occurred).

Figure 3C:
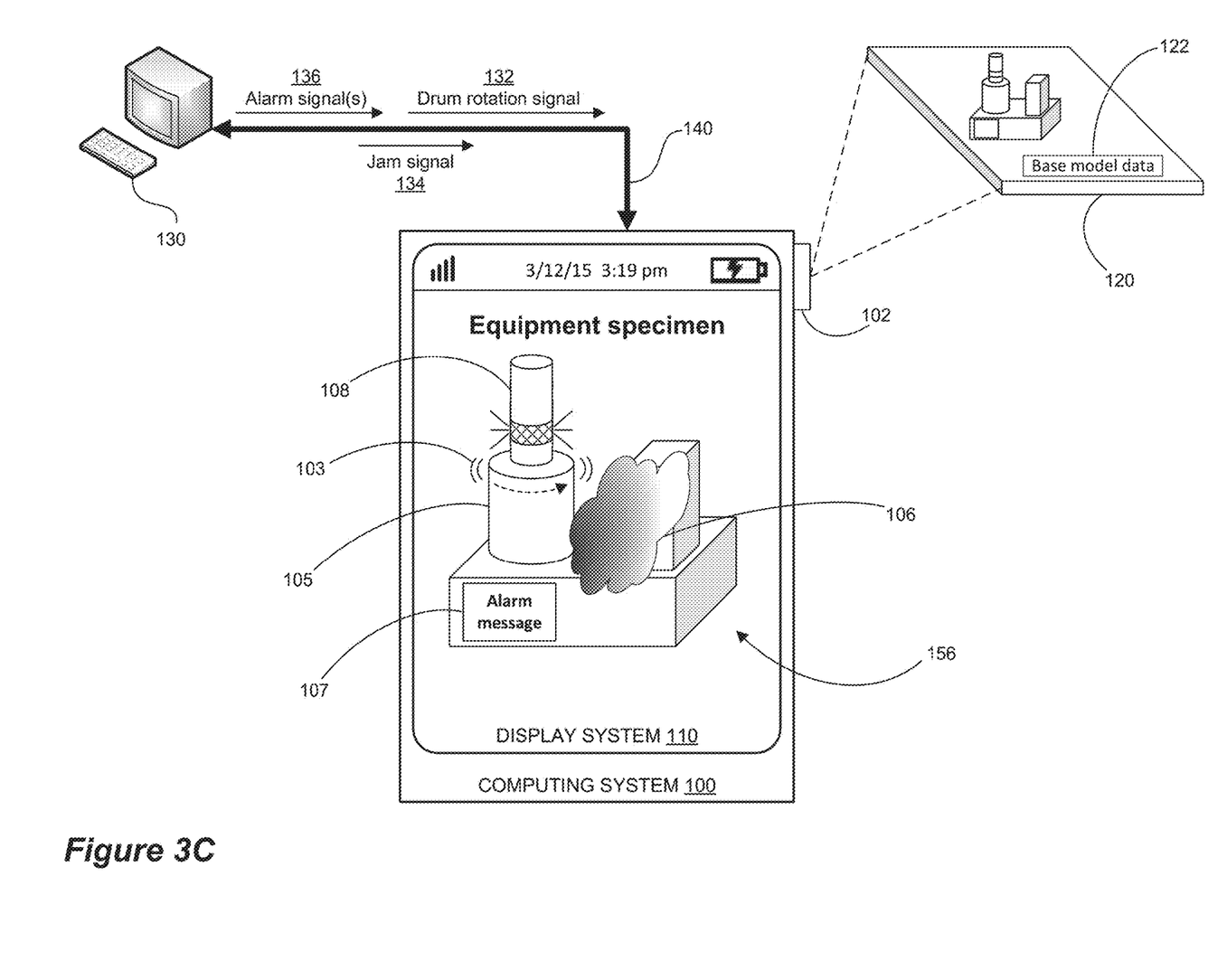

If a user wants to see what alarm options are available for a drum jam scenario, an "alarm" option (or a plurality of alarm options) can then be selected on model control unit 130 (or computing system 100), generating an alarm signal 136 that can be used internally within model control unit 130

(e.g., again as would be done in a standard demonstration device), but which also is sent via communication link 140 to computing system 100. Alarm signal 136 is processed to produce augmenting data that again updates augmented model image 154 to create an updated augmented model image 156 in which rotating drum 105 has jammed and one or more alarms have been triggered (as indicated by illumination of the warning light on tower 108 and the warning message appearing on screen 107 of the equipment specimen in FIG. 3C—in the generated model image on computing system 100, image 156 actually shows the drum 105 continuing to shake or rattle and smoke continuing to emerge from drum 105 in which a jam has occurred, along with the alarms chosen by the user at model control unit 130). In this situation an audio alarm might also be selected and would be generated in computing system 100 as well.

Figure 3D:
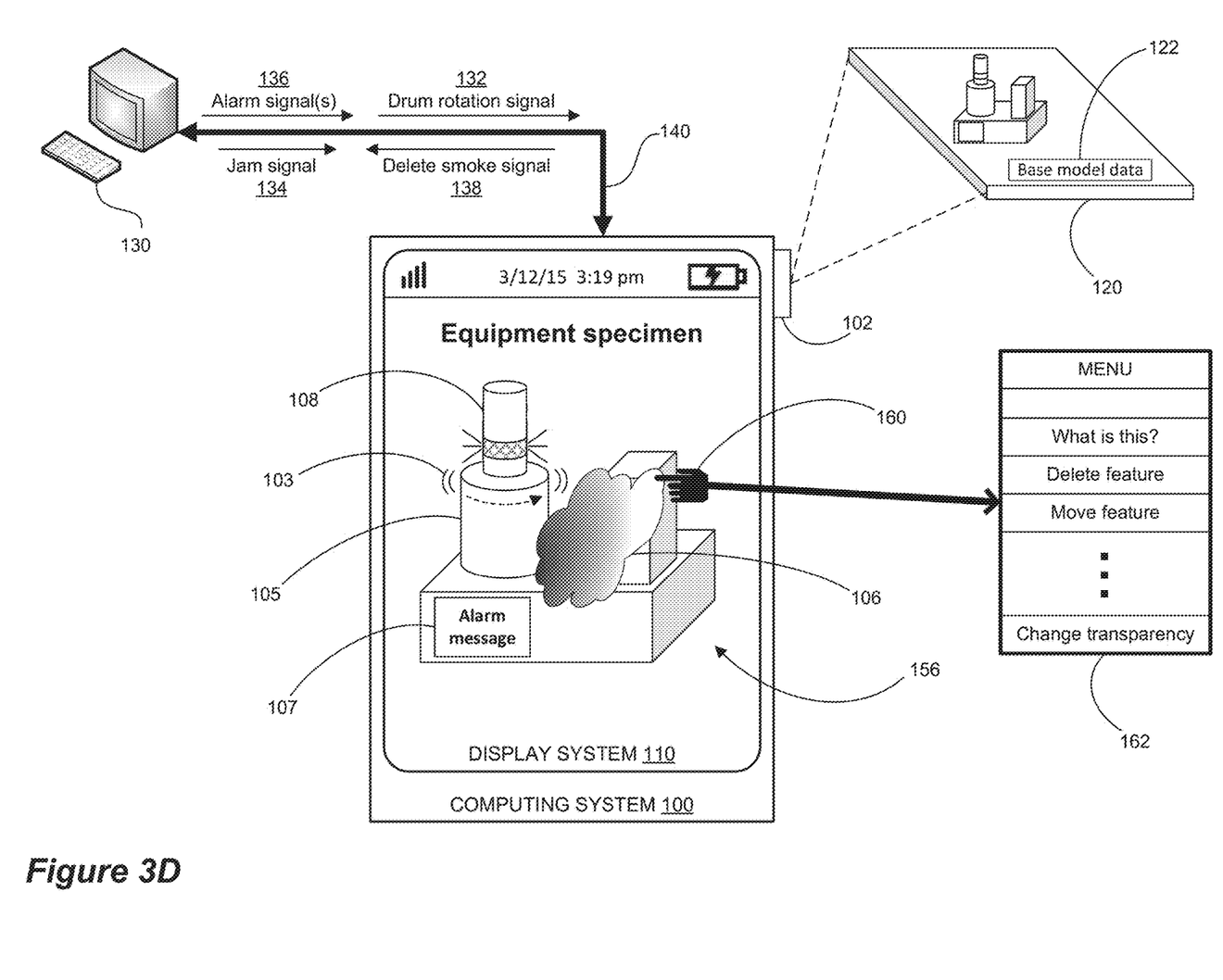
Figure 3E:
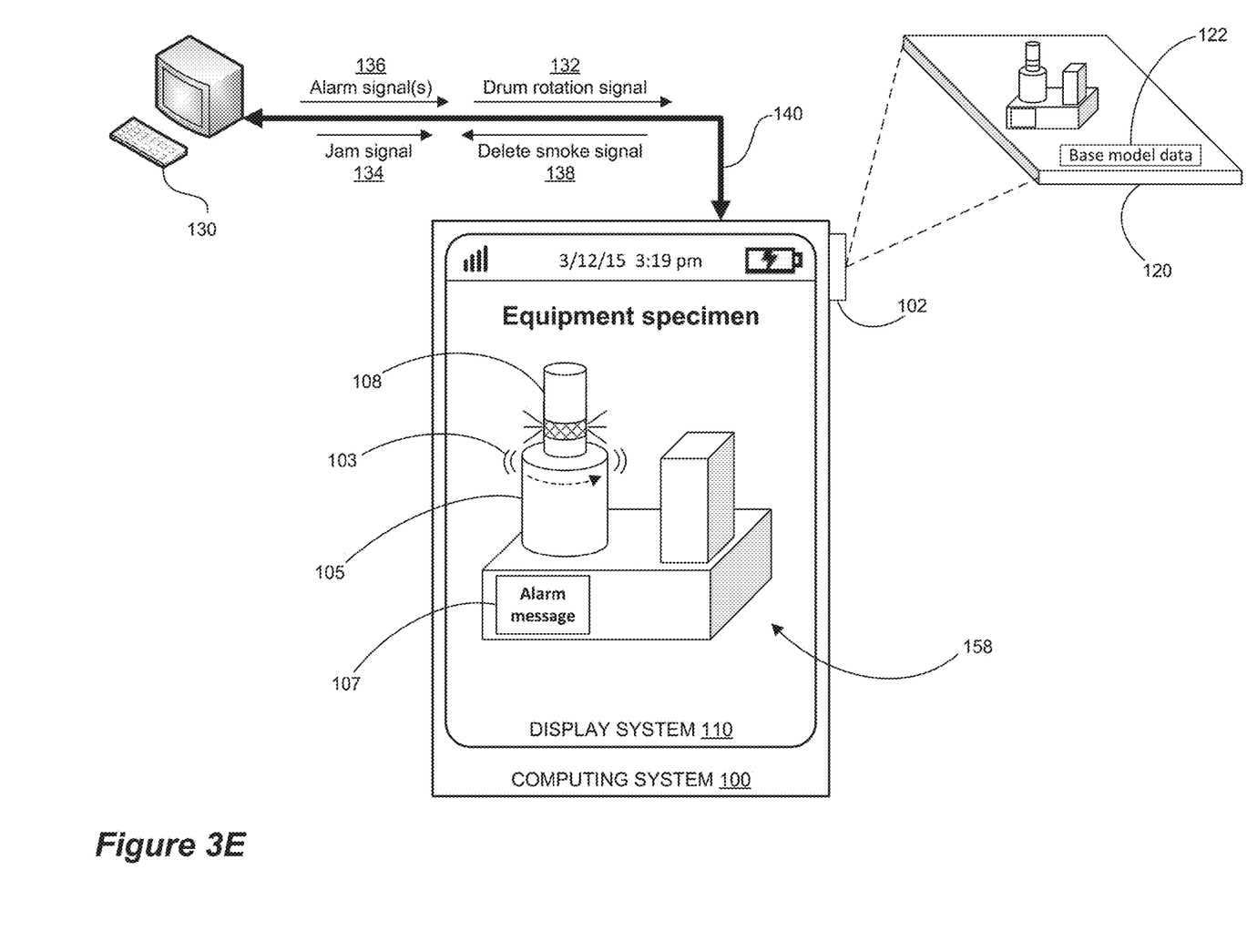

If a user wants to see the equipment specimen without the smoke 106 obscuring part of the view of the machinery, then the user can delete the smoke 106 by selecting that option on computing system 100. As seen in FIG. 3D, the user can use display system 110 (e.g., a touchscreen) to touch 160 the smoke component of the augmented model. A menu 162 or other option selection interface is presented that allows the user to select "Delete feature" from menu 162. A "delete smoke" signal 138 is sent via communication link 140 from computing system 100 to model control unit 130 so that information being processed and possibly presented on model control unit 130 can also be updated (again, the control signal 138 can be input at model control unit 130 as well). Once the smoke deletion selection has been made, the augmented model image is updated again to render image 158 of FIG. 3E. Throughout the sequence of FIGS. 3A-3E, movement of optical data acquisition device 102 changes the base model image (by updating the spatial data component of the model image data) and the augmenting data provided via model control unit 130 and/or display system 110 will be adapted to reflect the change in the model's appearance (e.g., size, orientation).

FIGS. 4A and 4B illustrate one or more methods of operation that can be performed in connection with implementations illustrated in the Figures, if desired. FIG. 4A illustrates a flow diagram showing method 480 in which a data acquisition device 402 (e.g., an optical data acquisition device) acquires base model data from a base model data source 420. Data acquisition device 402 can be controlled by a user, for example where device 402 is a camera or the like, including implementations in which the camera is integral to a smartphone, laptop, tablet or other device which can function as a computing system 400 (and which can, in some implementations, include a model control unit or be linked to an external model control unit). The base model data is processed by processing system 401 to generate an initial base model image which can be displayed on display system 410. Display system 410 displays the most current model image, which can be either the base model (if no augmentation has yet occurred) or the most recent augmented model image. Augmenting data is received by processing system 401, for example from a model control unit 430. This augmenting data is combined with the current model image to generate an updated model image on display system 410. Augmenting data can be provided via user input at unit 430. Also, augmenting data (e.g., user input) can be received at the display system 410 (e.g., via touchscreen) or through another user interface of computing system 400, after which display system 410 shows an updated (most current) model. Augmenting data can also be sent to the model control unit 430 for updating any demonstration, training or other information relating to the model image.

FIG. 4B shows a method of operation 490 in which a computing system acquires base model data (491) and thereafter renders a base model image (492). If augmenting data is received (493), then it is combined with any current model image to generate an augmented model (494). If no augmenting data is received, then a check is made for a change in the spatial data relating to the current model image (495). If spatial data relating to the current model image has changed (e.g., the base model data source is closer, farther away, at a different angle, in a different orientation), then the size, perspective and/or orientation of the current model image (whether a base model image or an augmented model image) is updated (496). Whether or not the spatial data changes, method 490 then returns to checking for augmenting data (493). The augmenting data can be received from a model control unit and/or can be received from a display system in some implementations. The specific order or sequence that the augmenting data check (493) and spatial data check (495) are performed can be different or they can be performed in parallel. Other changes to these updating functions can likewise be implemented.

Turning now to FIG. 5, a block diagram is shown that illustrates computing system 500 in an exemplary implementation. Computing system 500 provides an example of computing systems 100 of FIGS. 1A, 1B, 2, 3A-3E or any computing system that may be used to execute one or more of processes 480 and/or 490 of FIG. 4A or 4B, or variations thereof, although such systems could use alternative configurations. Computing system 500 includes processing system 501, storage system 504, software 506, communication interface 511, user interface 513, and optical data acquisition interface 515. User interface 513 comprises display system 510. Software 506 includes application 526 which itself includes one or both of display processes 480, 490. Display processes 480, 490 may optionally be implemented separately from application 526.

Computing system 500 may be representative of any computing apparatus, system, or systems on which application 526 and display processes 480, 490 or variations thereof may be suitably implemented. Examples of computing system 500 include mobile computing devices, such as cell phones, smartphones, tablet computers, laptop computers, wearable computing devices, notebook computers, and gaming devices, as well as any other type of mobile computing devices and any combination or variation thereof. Note that the features and functionality of computing system 500 may apply as well to desktop computers, server computers, and virtual machines, as well as any other type of computing system, variation, or combination thereof. In implementations utilizing these types of devices, components such as an optical data acquisition device may or may not be integral to the device.

Computing system 500 includes processing system 501, storage system 504, software 506, communication interface 511, user interface 513, and optical data acquisition interface 515. Processing system 501 is operatively coupled with storage system 504, communication interface 511, user interface 513, and optical data acquisition interface 515. User interface 513 can include one or more implementations of means for user interaction with computing system 500, including a touchscreen as part of display system 510. Other user interface interaction means can include a keyboard, mouse, stylus, voice command system and others.

Processing system 501 loads and executes software 506 from storage system 504. When executed by computing system 500 in general, and processing system 501 in particular, software 506 directs computing system 500 to operate as described herein for display processes 480, 490 or variations thereof, including descriptions of processes and operations relating to FIGS. 1A, 1B, 2, 3A-3E. Computing system 500 may optionally include additional devices, features, or functionality not discussed herein for purposes of brevity.

Referring still to FIG. 5, processing system 501 may comprise a microprocessor and other circuitry that retrieves and executes software 506 from storage system 504. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variations thereof.

Storage system 504 may comprise any computer-readable media or storage media readable by processing system 501 and capable of storing software 506. Storage system 504 may include volatile and nonvolatile, removable and non-removable media implemented in any method or technology for storage of information, such as computer-readable instructions, data structures, program modules, or other data. Storage system 504 may be implemented as a single storage device but may also be implemented across multiple storage devices or sub-systems co-located or distributed relative to each other. Storage system 504 may comprise additional elements, such as a controller, capable of communicating with processing system 501. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 513, processing system 501 loads and executes portions of software 506, such as display processes 480, 490, to render a base model image, an augmented model image, and/or a graphical user interface for application 526 for display by display system 510 of user interface 513. Software 506 may be implemented in program instructions and among other functions may, when executed by computing system 500 in general or processing system 501 in particular, direct computing system 500 or processing system 501 to identify an organizational role of a user of computing system 500. Software 506 may further direct computing system 500 or processing system 501 to determine a set of tasks for the user based on the organizational role of the user. Software 506 may further direct computing system 500 or processing system 501 to generate a base model image or to generate an augmented model image based on a combination of a base model image and augmenting data based on inputs, data and other information. Finally, software 506 may direct changes and updates being received by computing system 500 or being transmitted by computing system 500, based on how augmenting data is received and processed.

Software 506 may include additional processes, programs, or components, such as operating system software or other application software. Examples of operating systems include Windows®, iOS®, and Android®, as well as any other suitable operating system. Software 506 may also comprise firmware or some other form of machine-readable processing instructions executable by processing system 501.

In general, software 506 may, when loaded into processing system 501 and executed, transform computing system 500 overall from a general-purpose computing system into a special-purpose computing system customized to facilitate displaying tasks for one or more users and/or one or more model control units as described herein for each implementation. For example, encoding software 506 on storage system 504 may transform the physical structure of storage system 504. The specific transformation of the physical structure may depend on various factors in different implementations of this description. Examples of such factors may include, but are not limited to the technology used to implement the storage media of storage system 504 and whether the computer-readable storage media are characterized as primary or secondary storage.

In some examples, if the computer-readable storage media are implemented as semiconductor-based memory, software 506 may transform the physical state of the semiconductor memory when the program is encoded therein. For example, software 506 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 500 is generally intended to represent a computing system with which software 506 is deployed and executed in order to implement application 526 and/or display processes 480, 490 (and variations thereof, including processes and operations relating to FIGS. 1A, 1B, 2, 3A-3E). However, computing system 500 may also represent any computing system on which software 506 may be staged and from where software 506 may be distributed, transported, downloaded, or otherwise provided to yet another computing system for deployment and execution, or yet additional distribution. For example, computing system 500 could be configured to deploy software 506 over the internet to one or more client computing systems for execution thereon, such as in a cloud-based deployment scenario.

Communication interface 511 may include communication connections and devices that allow for communication between computing system 500 and other computing systems (not shown) or services, over a communication link 540 (including a network) or collection of networks. In some implementations, communication interface 511 receives augmenting data from a model control unit 530 over communication link 540. As seen in FIG. 5, model control unit 530 may also optionally be integral to computing system 500 and thus receive augmenting data via user interface 513. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 513 may include a voice input device, a touch input device for receiving a gesture from a user, a motion input device for detecting non-touch gestures and other motions by a user, and other comparable input devices and associated processing elements capable of receiving user input from a user. Output devices such as display system 510, speakers, haptic devices, and other types of output devices may also be included in user interface 513. Moreover, input and output capabilities may be combined in one or more devices or features of computing system 500. The aforementioned user input devices are well known in the art and need not be discussed at length here. User interface 513 may also include associated user interface software executable by processing system 501 in support of the various user input and output devices discussed above. Separately or in conjunction with each other and other hardware and software elements, the user interface software and devices may provide a graphical user interface, a natural user interface, or any other kind of user interface, including interfaces integral to the presentation of a base model image and/or augmented model image.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. Various technical effects will be appreciated based on the foregoing—for example, improved modeling including combining inputs from a connected model control unit and the display system and the ability to update the augmented model both with regard to operational conditions and features, as well as the manipulable spatial size, perspective and orientation of the three dimensional model, including improved control and evaluation of such models. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A memory device storing executable instructions that, in response to execution by a processor, cause the processor to perform operations comprising:
   obtaining base model data via an optical data acquisition device from optically readable indicia of a base model data source, the base model data providing three-dimensional (3D) image data for industrial automation equipment;
   generating a representation of the 3D image data that is spatially manipulable; and
   in response to receiving augmentation data from a model control unit, updating the representation of the 3D image data to reflect an operational characteristic of the industrial automation equipment, wherein the augmentation data comprises spatial changes of the optical data acquisition device and operational changes of operation of the industrial automation equipment.

2. The memory device of claim 1 wherein:
   the base model data is affected by a spatial relationship between the optical data acquisition device and the base model data source; and
   the representation of the 3D image data is spatially manipulable based on movement of the optical data acquisition device relative to the base model data source.

3. The memory device of claim 1 wherein:
   updating the representation of the 3D image data to reflect an operational characteristic includes depicting an animated display of functional operation of the industrial automation equipment.

4. The memory device of claim 1 wherein:
   The optical data acquisition device includes a camera integrated into a computing device including the processor.

5. The memory device of claim 4 wherein:
   the model control unit is external to the computing device; and
   the augmentation data is received via a communication interface of the computing device.

6. The memory device of claim 5 storing executable instructions that, in response to execution by the processor, cause the processor to perform operations further comprising:
   in response to receiving user input via a user interface of the computing device, further updating the representation of the 3D image data to reflect another operational characteristic of the industrial automation equipment.

7. The memory device of claim 6 wherein:
   further updating the representation of the 3D image data in response to the receiving the user input includes:
      transmitting a signal representing the user input to the model control unit via the communication interface;
      receiving additional augmentation data from the model control unit based on the signal; and
      further updating the representation of the 3D image data based on the additional augmentation data.

8. The memory device of claim 4 wherein:
   the model control unit is internal to the computing device; and
   the augmentation data is received from the model control unit responsive to user input received via a user interface of the computing device.

9. A system comprising:
   a computing device including:
      a graphical display;
      an optical data acquisition interface;
      a processor configured to:
         obtain base model data via the optical data acquisition interface from optically readable indicia of a base model data source, the base model data providing three-dimensional (3D) image data for industrial automation equipment;
         generate, on the graphical display, a representation of the 3D image data that is spatially manipulable; and
         in response to receiving augmentation data from a model control unit, update the representation of the 3D image data to reflect an operational characteristic of the industrial automation equipment in a real world environment, wherein the augmentation data comprises spatial changes of the optical data acquisition device and operational changes of the operation of the industrial automation equipment.

10. The system of claim 9 wherein:
the base model data is affected by a spatial relationship between the optical data acquisition interface and the base model data source; and
the processor is further configured to spatially manipulate the representation of the 3D image data based on movement of the optical data acquisition interface relative to the base model data source.

11. The system of claim 9, wherein the processor is further configured to:
update the representation of the 3D image data to reflect an operational characteristic by depicting an animated display of functional operation of the industrial automation equipment.

12. The system of claim 9 further comprising:
the computing device further includes a wireless communication interface;
the model control unit, wherein the model control unit is external to the computing device; and
wherein the processor is further configured to receive the augmentation data via wireless data communication using the wireless communication interface.

13. The system of claim 9 further comprising:
the computing device further includes a user interface; and
wherein the processor is further configured to update the representation of the 3D image data in response to receiving user input via the user interface.

14. The system of claim 13 wherein:
the processor is configured to update the representation of the 3D image data in response to receiving the user input by performing operations including:
send a signal representing the user input to the model control unit;
receive additional augmentation data from the model control unit based on the signal; and
further update the representation of the 3D image data based on the additional augmentation data.

15. The system of claim 13 wherein:
the computing device further includes:
the model control unit;
a user interface; and
the augmentation data is received from the model control unit responsive to user input received via the user interface.

16. A method comprising:
obtaining base model data via an optical data acquisition device from optically readable indicia of a base model data source, the base model data providing three-dimensional (3D) image data for industrial automation equipment;
generating, on a graphical display device, a representation of the 3D image data that is spatially manipulable; and
in response to receiving augmentation data from a model control unit, updating the representation of the 3D image data to reflect an operational characteristic of the industrial automation equipment, wherein the augmentation data comprises spatial changes of the optical data acquisition device and operational changes of the operation of the industrial automation equipment.

17. The method of claim 16 wherein:
the base model data is affected by a spatial orientation of the optical data acquisition device relative to the base model data source; and
the method further comprises spatially manipulating the representation of the 3D image, including adjusting a size and orientation of the representation, based on movement of the optical data acquisition device relative to the base model data source.

18. The method of claim 16 further comprising:
updating the representation of the 3D image data to reflect an operational characteristic includes depicting an animated display of functional operation of the industrial automation equipment.

19. The method of claim 16 further comprising:
updating the representation of the 3D image data in response to receiving user input via a touchscreen user interface, the touchscreen user interface comprising the graphical display device.

20. The method of claim 19, wherein:
updating the representation of the 3D image data in response to receiving user input further includes:
sending a signal representing the user input to the model control unit via wireless communication;
receiving additional augmentation data from the model control unit based on the signal; and
further updating the representation of the 3D image data based on the additional augmentation data.

* * * * *